United States Patent [19]

Miura

[11] 4,423,801

[45] Jan. 3, 1984

[54] SHOCK ABSORBER

[75] Inventor: Ieaki Miura, Yokohama, Japan

[73] Assignee: Tokico Ltd., Kawasaki, Japan

[21] Appl. No.: 249,749

[22] Filed: Apr. 1, 1981

[30] Foreign Application Priority Data

Apr. 9, 1980 [JP] Japan .............................. 55-47763[U]

[51] Int. Cl.$^3$ ............................................... F16F 9/19
[52] U.S. Cl. ............................................... 188/322.14
[58] Field of Search ............ 188/314, 315, 269, 322.14

[56] References Cited

U.S. PATENT DOCUMENTS

| | | | |
|---|---|---|---|
| 1,508,391 | 9/1924 | Greenwood | 188/322.14 |
| 2,320,697 | 6/1943 | Binder | 188/322.14 |
| 2,726,737 | 12/1955 | Chisholm | 188/322.14 |
| 3,587,789 | 6/1971 | Keilholz et al. | 188/269 |
| 3,701,402 | 10/1972 | Chelnokov et al. | 188/314 |

FOREIGN PATENT DOCUMENTS

| | | |
|---|---|---|
| 123391 | 9/1978 | Japan . |
| 124996 | 10/1978 | Japan . |
| 124997 | 10/1978 | Japan . |
| 128483 | 10/1978 | Japan . |

Primary Examiner—Duane A. Reger
Attorney, Agent, or Firm—Wegner & Bretschneider

[57] ABSTRACT

A hydraulic shock absorber comprises a cylinder, a piston slidably fitted in the cylinder to divide a space in the cylinder into two hydraulic fluid chambers, a piston rod which is secured at its one end to the piston and extended from said one end passing through one of the two fluid chambers, and projecting out of the cylinder while being slidably supported in a rod guide at one end of the cylinder, a damping force generating members mounted on the piston for throttling a flow of hydraulic fluid between the two fluid chambers, a fluid reservoir communicated to an another of the two fluid chambers and a valve mechanism provided in a channel that communicates said another fluid chamber with the fluid reservoir, the valve mechanism comprising a check valve allowing the hydraulic fluid to flow from the fluid reservoir to said another fluid chamber and a plurality of orifices provided at a plurality of positions in the check valve for throttling the flow of the hydraulic fluid from said another fluid chamber to the fluid reservoir.

6 Claims, 6 Drawing Figures

SHOCK ABSORBER

This invention concerns a hydraulic shock absorber.

A hydraulic shock absorber has been known, which comprises an inner cylinder, an outer cylinder coaxially disposed around the inner cylinder, a piston slidably fitted in the inner cylinder for defining the space in the inner cylinder into two fluid chambers, a piston rod which is secured at its one end to the piston, extended from the one end passing through one of the two fluid chambers and projecting out of the inner cylinder while being slidably supported in a rod guide at one end of the inner cylinder, a valve mounted on the piston for controlling or throttling the flow of hydraulic fluid between the two fluid chambers, and a fluid reservoir which is defined between the inner cylinder and the outer cylinder, communicated to the other of the two fluid chambers and filled with pressurized gases.

The hydraulic shock absorber of this known type is adapted such that, in the contracting stroke of the shock absorber in which the piston and the piston rod are advanced in the inner cylinder, the pressure in said one of the fluid chambers is kept from going to a negative or reduced pressure, by throttling the channel communicating the fluid reservoir with the other fluid chamber to maintain the pressure in the other of the fluid chamber to thereby surely open the valve of the piston.

However, since the communication channel is throttled in the known shock absorber, it is difficult to flow sufficient amount of the hydraulic fluid from the fluid reservoir to the other fluid chamber in the extending stroke of the shock absorber in which the piston and the rod extend outwardly from the inner cylinder, and thus returning of the piston can not be attained readily.

For overcoming such problems, an improvement has been made to a shock absorber in which a check valve is provided in the communication channel for allowing sufficient amount of the hydraulic fluid to flow from the fluid reservoir to the other fluid chamber and, further, an orifice is provided to the check valve for throttling the flow of the hydraulic fluid from the other fluid chamber to the fluid reservoir. The shock absorber of such an improved type may, however, cause cavitations in the orifice, when the hydraulic fluid issues from the orifice to the fluid reservoir, making it impossible to obtain stable damping force depending on the advancing speed of the piston and possibly produce large swish sounds as well, in the contracting stroke of the shock absorber.

The object of this invention is to provide a hydraulic shock absorber which can produce a predetermined stable damping force depending on the value of impact shocks or the advancing speed of the piston in the contracting stroke of the shock absorber, as well as allow smooth or ready returning of the piston in the extending stroke of the shock absorber.

The foregoing object can be attained by a hydraulic shock absorber comprising a cylinder, a piston slidably fitted in the cylinder to define a space in the cylinder into two cylinder into two hydraulic fluid chambers, a piston rod which is secured at its one end to the piston and extended from the one end passing through one of the two fluid chambers, and projecting out of the cylinder while being slidably supported in a rod guide at one end of the cylinder, a damping force generating means mounted on the piston for throttling a flow of hydraulic fluid between the two fluid chambers, a fluid reservoir communicated to an another of the two fluid chambers and a valve mechanism provided in a channel that communicates said another fluid chamber with the fluid reservoir, the valve mechanism comprising a check valve allowing the hydraulic fluid to flow from the fluid reservoir to said another fluid chamber and a plurality of orifices provided at a plurality of positions in the check valve for throttling the flow of the hydraulic fluid from said another fluid chamber to the fluid reservoir.

This invention is to be described in more details referring to the accompanying drawings, by which the foregoing and other objects, as well as the features of this invention will be made clearer in which:

FIG. 1 shows a hydraulic shock absorber as the first preferred embodiment of this invention.

Figure 1:
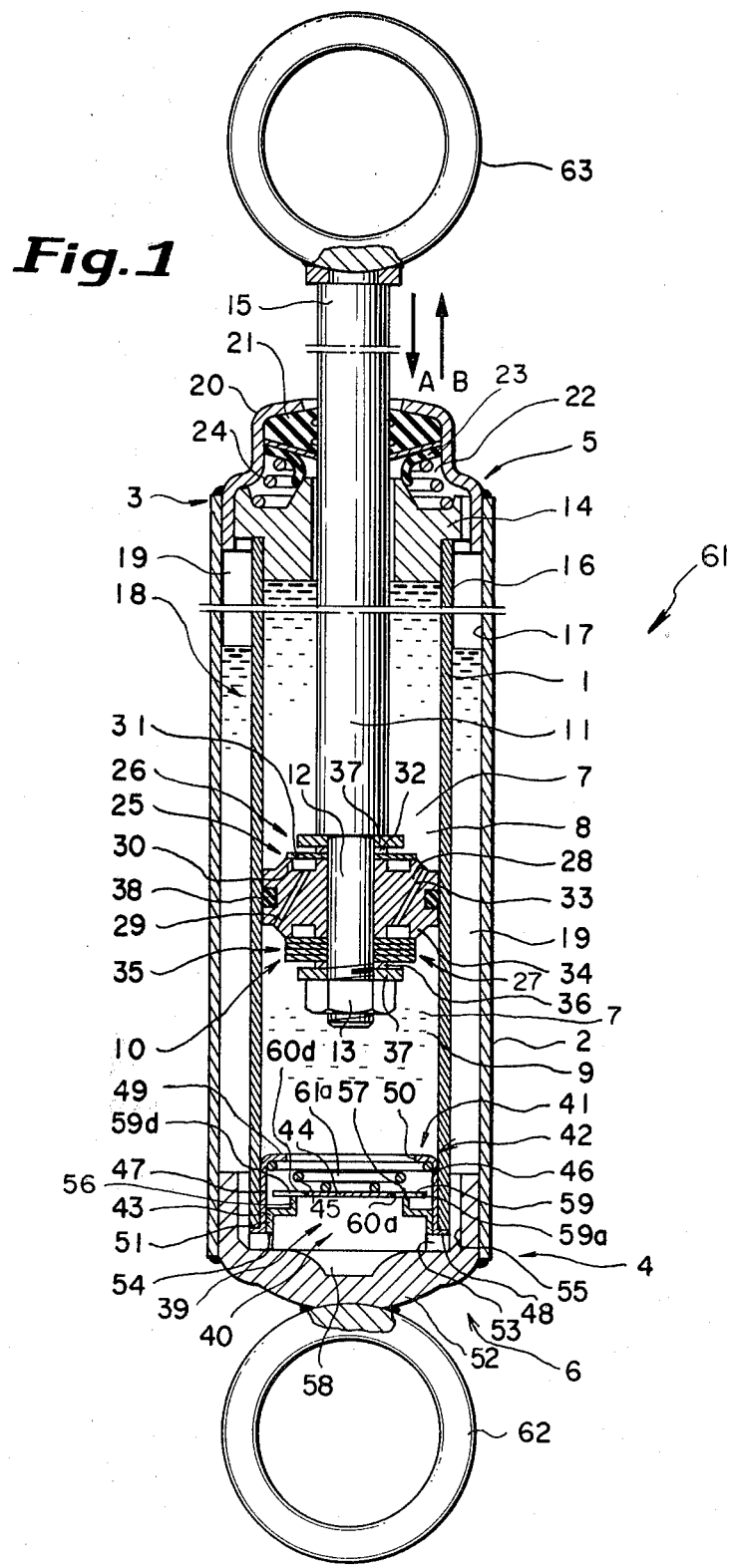
FIG. 1 is an illustrative cross sectional view of the hydraulic shock absorber as a first preferred embodiment of this invention.

A cylinder 1 and an outer cylinder 2 that coaxially surrounds the cylinder 1 have at their both ends 3, 4 cap mechanisms 5, 6 secured thereto. A piston assembly 10 is fitted slidably, in the directions A, B, in the inner cylinder 1 for defining a space 7 in the cylinder 1 into two chambers 8, 9. The piston assembly 10 is secured to one end 12 of a piston rod 11 with a nut 13. The piston rod 11 extends from its one end 12 passing through chamber 8 and supported, slidably in the direction A, B, in a rod guide 14 fitted to the end 3 of the cylinder 1. The piston rod 11 projects at its other end 15 out of the cylinder 1.

The chambers 8, 9 are filled with hydraulic fluid and an annular chamber 19 within a fluid reservoir 18 defined between the outer circumferential wall 16 of the inner cylinder 1 and the inner circumferential wall 17 of the outer cylinder 2 is filled with hydraulic fluid and pressurized gas. The cap mechanism 3 is arranged such that the pressurized gas in the annular chamber 19 may not intrude into the fluid chamber 8 and the pressurized gas in the annular chamber 19 and the hydraulic fluid in the fluid chamber 8 may not leak externally. Specifically, the cap mechanism 3 comprises a cap 20 engaged tightly to the outer cylinder 2, a packing member 21 mounted in the cap 20 for preventing the fluid from flowing out of the fluid chamber 8, a flexible annular valve body 23 acting as a check valve in cooperation with the upper annular edge of the rod guide 14 for preventing the pressurized gas from flowing into the fluid chamber 8 from a small chamber 22 that communicates with a pressurized gas containing area in the upper portion of the annular chamber 19 and a spring 24 for ensuring the sealing function of the packing member 21 to the fluid chamber 8 and for securing the valve body 23 and the rod guide 14.

A damping force generating means 25 is mounted on the piston assembly 10 for throttling or controlling the flow of the hydraulic fluid in the fluid chambers 8, 9 to generate damping force. The damping force generating means 25 comprises two disc valves 26, 27. The disc valve 26 is a valve that throttles the flow of the hydraulic fluid from the fluid chamber 9 to the fluid chamber 8 when the piston 10 and the piston rod 11 advance in the cylinder 1 along the direction A. The disc valve 26 includes a through-hole 29 formed in a piston body 28, a disc 31 as a valve body that cooperates with an annular projection 30 as a valve seat which is formed at the piston body 28 on the side of the chamber 8, and a retainer 32 for retaining the disc 31 at its central portion. While, the disc valve 27 is a valve that throttles the flow of the hydraulic fluid from the fluid chamber 8 to the fluid chamber 9 when the piston 10 and the piston rod 11 extend out of the cylinder 1. The disc valve 27 includes a through-hole 33 formed in the piston body 28, a disc 35 as a valve body that cooperates with an annular projection 34 as a valve seat formed at the piston body 28 on the side of the fluid chamber 9, and a retainer 36 for retaining the disc 35 at its central portion. In the drawing, numeral 37 represents a washer and numeral 38 represents a sealing ring.

A valve mechanism 41 is provided within the lower end portion 40 of the cylinder 1 as a channel that communicates the fluid reservoir 18 with the fluid chamber 9. The valve mechanism 41 has a check valve mechanism 42 that allows the hydraulic fluid to flow from the fluid reservoir 18 to the fluid chamber 9. The check valve mechanism 42 comprises a valve seat member 43 generally of a cylindrical shape, a valve body member 44 generally of a disc shape, a spring member 45 for resiliently biasing the valve body member 44 to the valve seat member 43 and a spring bearing member 46 generally of a cylindrical shape. The spring bearing member 46 is just fitted at its body portion 47 to the lower end 40 of the inner cylinder 1 and formed at its lower end with a flange 48, which is held by the lower end face of the inner cylinder 1. An annular projection 49 is extended radially inwardly, for supporting the spring member 45, from the body portion 47 at the end of the spring bearing member 46 on the side of the fluid chamber 9. The projected end of the annular projection 49 defines a circular opening 50 as the opening of the communication channel 39 on the side of the fluid chamber 9. The valve seat member 43 is just fitted at its body portion 51 to the body portion 47 of the spring bearing member 46 and formed at its lower end with a flange 53 which is put between a cap 52 of the cap mechanism 4 and the flange 48 of the spring bearing member 46. A plurality of notches 54 extending radially are formed in the flange 53 of the valve seat member 43. The notches 54 communicate to a groove 55 formed axially in the inner wall of the cap 52 tightly engaged both to the inner and the outer cylinders 1, 2. The notches 54 and the groove 55 define an opening of the communication channel 39 on the side of the fluid reservoir 18. The body portion 51 of the valve seat member 43 has a reduced-diameter portion 56 at its upper portion and an annular end face 57 of the reduced cylindrical body portion 56 acts as a valve seat. The outer diameter of the body portion 56 is smaller than the diameter of the valve body 44. Since the valve body 44 detaches from the valve seat 57 in the check valve mechanism 42 when the piston 10 and the piston rod 11 extend out of the cylinder 1 in the direction B, the hydraulic fluid in the fluid reservoir 18 flows readily passing through the groove 55, the notches 54, the chamber 58, the valve 42 and the opening 50 into the fluid chamber 9. Consequently, the piston 10 and the piston rod 11 extend readily in the direction B at a speed which is mainly controlled by the disc valve 27 under the action of the pressurized gas in the chamber 19. Since the check valve 42 is opened to enlarge the area of the communication channel 39, the piston 10 and the piston rod 11 can be displaced readily in the direction B even if the pressure of the pressurized gas is relatively low. Thus, if the pressure of the pessurized gas should somewhat decrease due to partial leakage of the pressurized gas, the piston 10 and the piston rod 11 can surely be displaced in the direction B.

In the valve mechanism 41, a plurality of notches 59a, 59b, 59c, 59d, 59e and 59f are formed in a uniform circumferential distribution at the outer circumferential edge of the disclike valve body 44 in the check valve 42. The notches 59a, 59b, 59c, 59d, 59e and 59f are radially extended inwardly exceeding the inner circumferential surface of the valve seat 43 at its reduced-diameter body portion 56 to form orifices 60a, 60b, 60c, 60d, 60e and 60f between the notches 59a, 59b, 59c, 59d, 59e and 59f and the reduced-diameter body portion 56 of the valve seat 43 for communicating the chamber 58 with the chamber 9. In the valve mechanism 41, since the hydraulic fluid in the fluid chamber 9 is throttled by the plurality of orifices 60a to 60f to flow into the chamber 58 when the piston 10 and the piston rod 11 advance deeply in the cylinder 1 in the direction A, the fluid in the chamber 9 can be maintained at a sufficient pressure to open the valve 26. As the result, it is less likely to occur that the pressure in the chamber 8 goes negative or becomes low to hinder the movement of the piston 10 in the direction A. Since the diameter of the opening 50 is greater than the inner diameter of the reduced-diameter portion 56 of the valve seat 43, the hydraulic fluid in the fluid chamber 9 can flow axially through the orifices 60a to 60f into the chamber 58. Moreover, since the notches 59a to 59f are diverged radially, the hydraulic fluid in the chamber 61a between the valve seat 43 and the valve spring bearing member 46 can flow in the direction A and radially inwardly through the orifices 60a to 60f into the chamber 58. The notches 59a to 59f may be diverged gradually from the chamber 9 to the chamber 58 (downwardly in FIG. 1) so that the hydraulic fluid can be guided through the orifice more radially inwardly as they go downwardly. The notches 59 uniformly distributed circumferentially may be provided by any desired number including both even number and odd number so long as they are provided by two or more. Further, the distribution of the notches 59 is not necessarily uniform, although the uniform distribution is preferable. Furthermore, the configuration for each of the notches 59 shown in FIG. 2 may be of any desired shapes such as of trigonal, quadral and semi-circular shapes. Furthermore, the cross sectional profile of the body portion 56 or the valve body 44 which is in perpendicular to the axis may not always by circular. Moreover, the spring 45 which is shown as a conical spring in this embodiment can be replaced with a cylindrical coil spring and, in this case, the annular projection 49 of the spring receiving member 46 may be extended radially inwardly as a support of the cylindrical coil spring.

In a case where the hydraulic shock absorber 61 having the foregoing constitution is applied to a vehicle such as a passenger car, a fitting 62 secured to the cap 52 is fixed to the axle of the vehicle and a fitting 63 secured to the projection end 15 of the piston rod 11 is secured to the vehicle chassis.

In the contracting stroke of the hydraulic shock absorber 61 in which impact shock is exerted to the vehicle chassis in the direction A or to the axle in the direction B and the piston 10 and the piston rod 11 advance in the direction A within the cylinder 1, since a plurality of orifices 60 are provided in the check valve 42 of the valve mechanism 41, a predetermined stable damping force can be produced by the disc valve 26 and the like depending on the impact shock, and no substantial swishing sounds are resulted actually. In addition, in the extending stroke of the shock absorber 61 in which the piston 10 and the piston rod 11 extend in the direction B, since the check valve 42 is opened under the action of the pressurized gas in the chamber 19, the piston 10 can be smoothly and readily returned.

Figure 2:
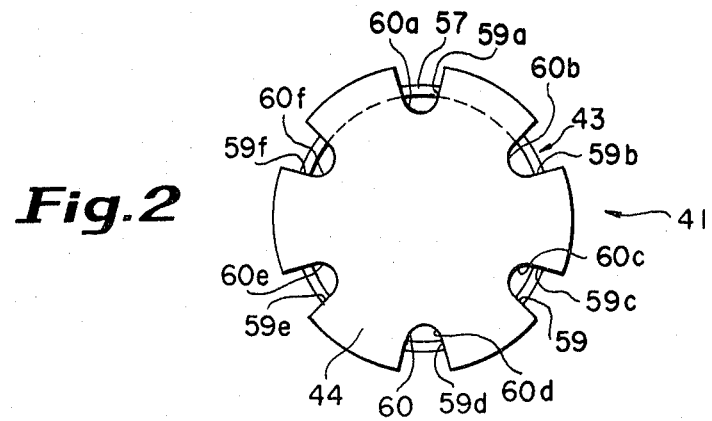
FIG. 2 is an illustrative view of the orifice portion of the valve mechanism shown in FIG. 1.
Figure 3:
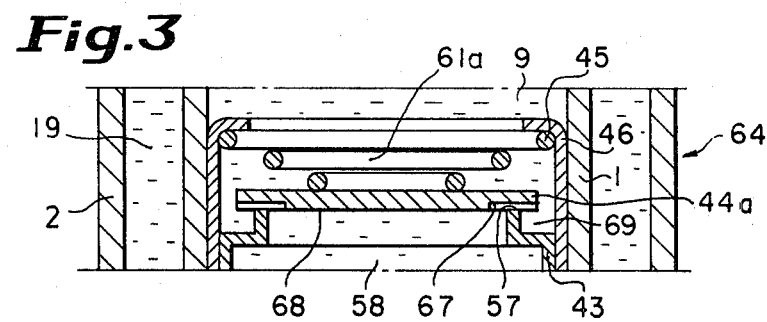
FIG. 3 is an illustrative cross sectional view of the valve mechanism in one modified embodiment.
Figure 4:
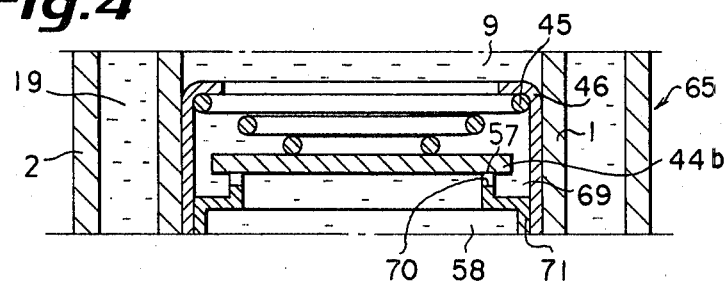
FIG. 4 is an illustrative cross sectional view of the valve mechanism in a further modified embodiment.
Figure 5:
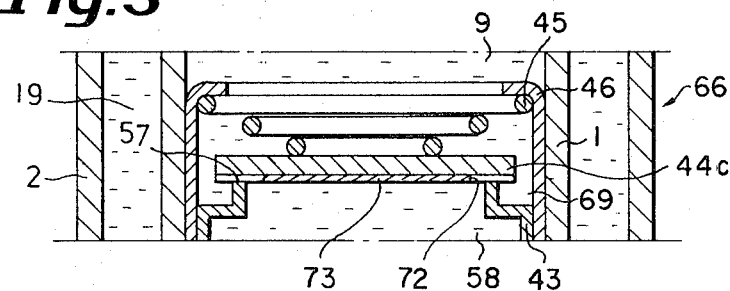
FIG. 5 is an illustrative cross sectional view of the valve mechanism in a still further modified embodiment.

The valve mechanism 41 shown in FIG. 1 and FIG. 2 may be replaced with the valve mechanism 64, 65 or 66 shown in FIGS. 3 to 5.

In FIGS. 3 to 5, identical members to those shown in FIG. 1 and FIG. 2 carry the same numerals.

In the valve mechanism 64 shown in FIG. 3, a plurality of grooves 67 are formed radially to the outer circumferential edge of the disc-like valve body 44a on its face 68 that abuts against the valve seat 57 so as to throttle the flow of the hydraulic fluid from the fluid chamber 9 to the fluid reservoir 18. In the contracting stroke of the shock absorber, the hydraulic fluid in the fluid chamber 9 is introduced from an annular chamber 69 in the chamber 61a, through the plurality of grooves 67 as the orifices, radially inwardly into the chamber 58.

In the valve mechanism 65 shown in FIG. 4, a valve body member is a disc-like valve body 44b and a valve seat member is a member 71 comprising a valve seat 57 formed with a plurality of cut-out portions or notches 70, in which the flow of the hydraulic fluid from the fluid chamber 9 to the fluid reservoir 18 is throttled at the notches 70. In the contracting stroke of the shock absorber, the hydraulic fluid in the fluid chamber 9 is introduced radially inwardly from the annular chamber 69 through the plurality of cut-out portions 70 as the orifices into the chamber 58.

In the valve mechanism 66 shown in FIG. 5, a valve body member is a thin disc-like valve body 44c and a valve seat member is the member 43. A further disc-like member 73 having a plurality of cut-out portions or notches 72 at its outer circumferential edge is located between the valve body 44c and the valve sheet member 43, and the member 73 is secured to the valve body 44c. In the contracting stroke of the hydraulic shock absorber, the hydraulic fluid in the fluid chamber 9 is introduced radially inwardly from the annular chamber 69 through the plurality of notches 72 as the orifices into the chamber 58. The flow of the hydraulic fluid from the fluid chamber 9 to the fluid reservoir 18 is throttled in the notches 72.

Figure 6:
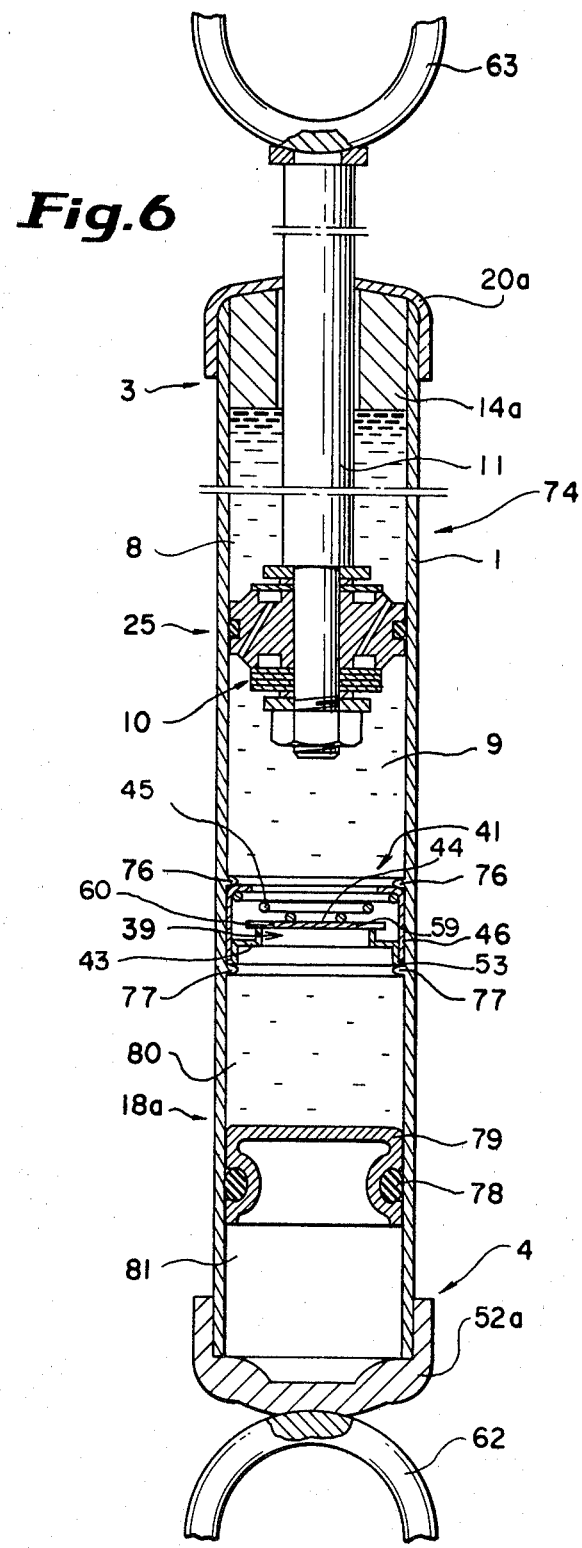
FIG. 6 is an illustrative cross sectional view of the hydraulic shock absorber as a second preferred embodiment of this invention.

FIG. 6 shows a modified hydraulic shock absorber 74 comprising one cylinder 1. In FIG. 6 identical members to those shown in FIG. 1 and FIG. 2 carry the same numerals.

In the shock absorber 74 shown in FIG. 6, a cylinder 1 is closed at its one end 3 with a rod guide 14a and a cap 20a, and closed at its the other end 4 with a cap 52a. The valve mechanism 41 is secured by inward projections 76, 77 to the cylinder 1 at the middle portion of the cylinder 1 as the communication channel 39. The projections 76, 77 may be formed such as by caulking. In this case, the valve spring bearing member 46 has no flange such as the flange 48 in the previous embodiments and the valve seat 43 is provided with a part of a flange 53 with no notches so that the spring bearing member 46 and the valve seat 43 can just be fitted in the cylinder 1.

A free piston 79 mounted with a seal ring 78 is slidably fitted in the cylinder 1 between the valve mechanism 41 and the end 4 of the cylinder 1. Hydraulic fluid is filled within a chamber 80 between the free piston 79 and the valve mechanism 41, and pressurized gas is encapsulated within a chamber 81 between the free piston 79 and the cylinder end 4. The chamber 80 and 81 define a fluid reservoir 18a. It will be apparent that the shock absorber 74 in FIG. 6 can function in the same manner as the shock absorber 61 in FIG. 1. In the shock absorber 74, the second valve mechanism 41 may be substituted with any one of the valve mechanisms 64, 65 or 66, after slight change to be fitted in the cylinder 1.

Instead of forming reservoir 18 at the lower portion of one cylinder 1, the shock absorber 74 may have a fluid reservoir defined by a vessel which is provided separately to a cylinder 1, contains pressurized gas in the upper portion and hydraulic fluid in the lower portion, and is communicated at its lower portion with a hydraulic fluid chamber 9 by way of a communication channel, where a valve mechanism 41 is secured. The valve mechanism 41 may be secured to the opening of the vessel to the communication channel or to the opening of the cylinder 1 to the communication channel.

What is claimed is:

1. A hydraulic shock absorber, comprising:
   a cylinder;
   a piston slidably fitted within the cylinder to divide the cylinder into two hydraulic fluid chambers;
   a piston rod secured at one end to the piston and extending from said one end, passing through one of the two fluid chambers, and projecting out of the cylinder while being slidably supported in a rod guide at one end of the cylinder;
   a damping force generating means mounted on the piston for generating damping forces by throttling a flow of hydraulic fluid from said one fluid chamber to the other of said two fluid chambers and also by throttling a flow of hydraulic fluid from said other fluid chamber to said one fluid chamber;
   a fluid reservoir communicated with said other fluid chamber through a channel and filled with hydraulic fluid and pressurized gas; and
   a valve mechanism provided in the communicating channel, the valve mechanism comprising a check valve allowing the hydraulic fluid to flow from the fluid reservoir to said other fluid chamber, the check valve having a valve body, a valve seat member and a plate-like member disposed at a position between the valve body and a valve seat of the valve seat member, and a plurality of orifices composed of a plurality of cut-out portions provided at a plurality of positions of the plate-like member for throttling the flow of the hydraulic fluid from said other fluid chamber to the fluid reservoir, the sizes of said orifices being kept constant during the contraction stroke of the shock absorber.

2. The hydraulic shock absorber according to claim 1, in which an outer cylinder for surrounding said cylinder is coaxially provided to said cylinder, and said fluid reservoir is defined between an outer circumferential wall of said cylinder and an inner circumferential wall of said outer cylinder.

3. The hydraulic shock absorber according to claim 1, in which said valve mechanism is mounted in said cylinder and said fluid reservoir comprises a hydraulic fluid chamber communicating said other fluid chamber and a pressurized gas chamber divided by a free piston fitted to said cylinder at a position between said valve mechanism and a closed end of said cylinder.

4. An hydraulic shock absorber, comprising:
a cylinder;
a piston slidably fitted within the cylinder to divide the cylinder into two hydraulic fluid chambers;
a piston rod secured at one end to the piston and extending from said one end, passing through one of the two fluid chambers, and projecting out of the cylinder while being slidably supported in a rod guide at one end of the cylinder;
a damping force generating means mounted on the piston for generating damping forces by throttling a flow of hydraulic fluid from said one fluid chamber to the other of said two fluid chambers and also by throttling a flow of hydraulic fluid from said other fluid chamber to said one fluid chamber;
a fluid reservoir communicated with said other fluid chamber through a channel and filled with hydraulic fluid and pressurized gas; and
a valve mechanism provided in the communicating channel, the valve mechanism comprising a check valve allowing the hydraulic fluid to flow from the fluid reservoir to said other fluid chamber, the check valve having a valve body and a valve seat member, and a plurality of orifices composed of a plurality of cut-out portions provided at a plurality of positions of a valve seat of the valve seat member for throttling the flow of the hydraulic fluid from said other fluid chamber to the fluid reservoir, the sizes of said orifices being kept constant during the contraction stroke of the shock absorber.

5. The hydraulic shock absorber according to claim 4, in which an outer cylinder for surrounding said cylinder is coaxially provided to said cylinder, and said fluid reservoir is defined between an outer circumferential wall of said cylinder and an inner circumferential wall of said outer cylinder.

6. The hydraulic shock absorber according to claim 4, in which said valve mechanism is mounted in said cylinder and said fluid reservoir comprises a hydraulic fluid chamber communicating said other fluid chamber and a pressurized gas chamber divided by a free piston fitted to said cylinder at a position between said valve mechanism and a closed end of said cylinder.

* * * * *